(12) United States Patent
Yamamoto

(10) Patent No.: US 8,744,643 B2
(45) Date of Patent: Jun. 3, 2014

(54) VEHICLE CONTROLLER

(75) Inventor: Shinsuke Yamamoto, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/320,860

(22) PCT Filed: May 18, 2009

(86) PCT No.: PCT/JP2009/059133
§ 371 (c)(1),
(2), (4) Date: Nov. 16, 2011

(87) PCT Pub. No.: WO2010/134152
PCT Pub. Date: Nov. 25, 2010

(65) Prior Publication Data
US 2012/0065812 A1 Mar. 15, 2012

(51) Int. Cl.
*B62D 33/067* (2006.01)
*B62D 33/073* (2006.01)

(52) U.S. Cl.
USPC .............................. 701/1; 180/89.1

(58) Field of Classification Search
CPC ............. B60C 23/044; B60G 17/0195; B62D 33/067; B62D 33/07; B62D 33/073
USPC ................. 180/80.13–89.19; 701/36, 50, 124
See application file for complete search history.

(56) References Cited

U.S. PATENT DOCUMENTS

| | | | | |
|---|---|---|---|---|
| 5,623,410 A | * | 4/1997 | Furihata et al. | 701/37 |
| 5,954,149 A | * | 9/1999 | Williams | 180/89.12 |
| 6,264,222 B1 | * | 7/2001 | Johnston et al. | 280/166 |
| 6,273,203 B1 | * | 8/2001 | Paggi et al. | 180/89.13 |
| 6,434,457 B2 | * | 8/2002 | Okita et al. | 701/30.1 |
| 8,578,861 B2 | * | 11/2013 | Hepner et al. | 105/141 |
| 8,620,521 B2 | * | 12/2013 | Kanemaru et al. | 701/36 |
| 2001/0044359 A1 | * | 11/2001 | Saito et al. | 477/92 |
| 2002/0104699 A1 | * | 8/2002 | Damhuis | 180/89.14 |
| 2002/0144849 A1 | * | 10/2002 | Peddycord et al. | 180/89.14 |

(Continued)

FOREIGN PATENT DOCUMENTS

| | | | |
|---|---|---|---|
| JP | 61-067610 A | 4/1986 | |
| JP | 06-219338 A | 8/1994 | |

(Continued)

OTHER PUBLICATIONS

International Search Report mailed Jun. 16, 2009 of PCT/JP2009/059133.
Translation of IPRP dated Jun. 3, 2010.

*Primary Examiner* — Fadey Jabr
*Assistant Examiner* — Courtney Heinle
(74) *Attorney, Agent, or Firm* — Kenyon & Kenyon LLP

(57) ABSTRACT

A vehicle controller which can perform appropriate control even when an acceleration sensor is mounted in a movable portion of a vehicle. The vehicle controller includes an acceleration sensor attached to a cabin movable around a shaft, an open/closed state detection section which detects the open/closed state of the cabin, and a correction section which corrects the output value of the acceleration sensor. When the open/closed state detection section detects that the cabin is opened and then closed, the correction section performs correction. When the acceleration sensor is provided in the cabin serving as a movable portion, the inclination of the acceleration sensor may differ slightly before and after the cabin is opened.

3 Claims, 6 Drawing Sheets

(56) References Cited

U.S. PATENT DOCUMENTS

| | | | |
|---|---|---|---|
| 2005/0264038 A1* | 12/2005 | Albright | 296/190.05 |
| 2009/0195024 A1* | 8/2009 | Cott et al. | 296/190.08 |
| 2010/0058791 A1* | 3/2010 | Quesada Saborio | 62/259.1 |
| 2011/0246101 A1* | 10/2011 | Araki et al. | 702/50 |
| 2011/0266834 A1* | 11/2011 | Beumer | 296/190.05 |
| 2012/0173081 A1* | 7/2012 | Hsu et al. | 701/42 |
| 2012/0173085 A1* | 7/2012 | Hilberer et al. | 701/46 |

FOREIGN PATENT DOCUMENTS

| | | | |
|---|---|---|---|
| JP | 07-301641 A | 11/1995 | |
| JP | 08-062249 A | 3/1996 | |
| JP | 09-154201 A | 6/1997 | |
| JP | 2000-111571 A | 4/2000 | |
| JP | 2003-063375 A | 3/2003 | |
| JP | 2005162034 A * | 6/2005 | B62D 33/067 |
| JP | 2008-216226 A | 9/2008 | |

\* cited by examiner

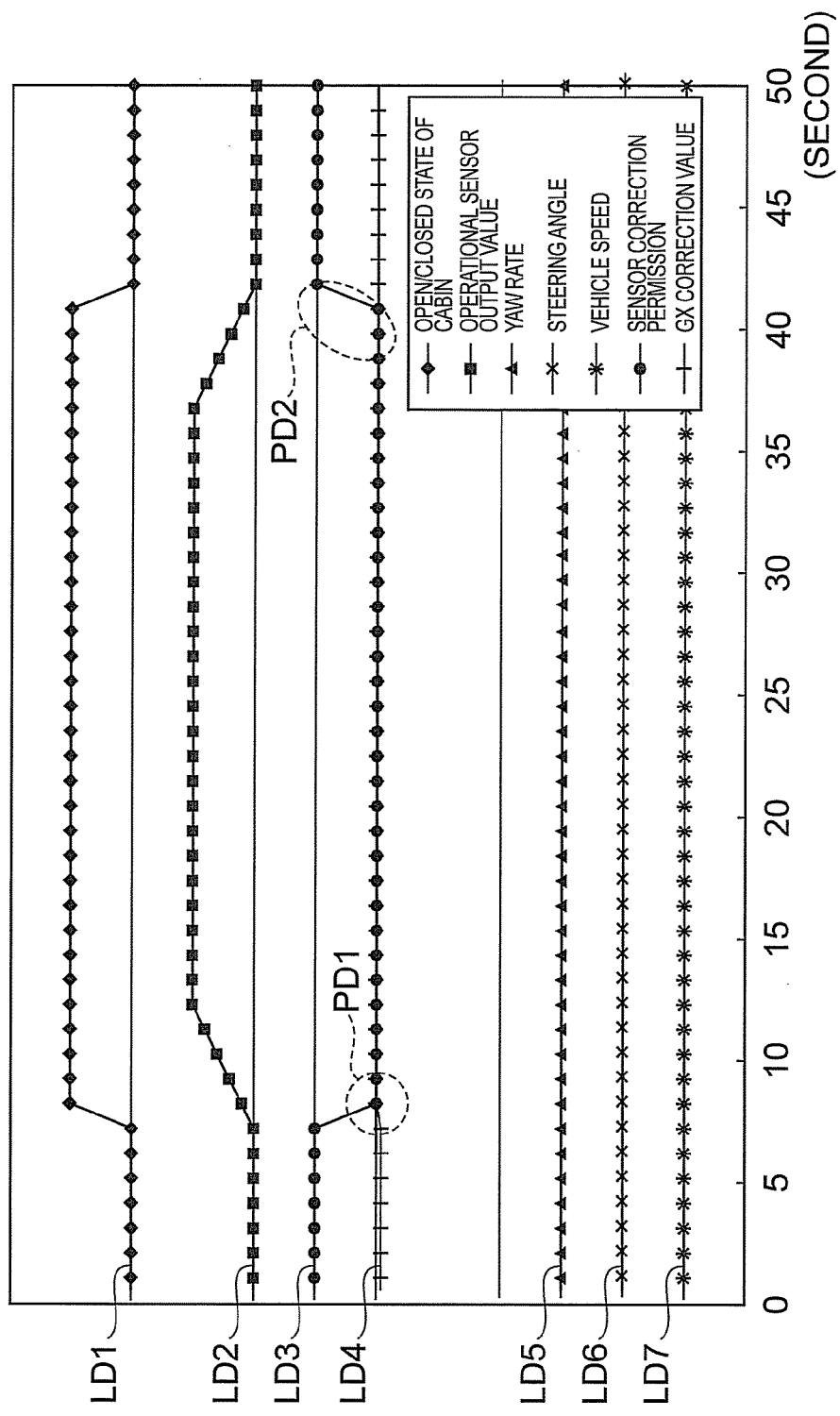

VEHICLE CONTROLLER

This is a 371 national phase application of PCT/JP2009/059133 filed 18 May 2009, the contents of which are incorporated herein by reference.

TECHNICAL FIELD

The present invention relates to a vehicle controller which controls a vehicle having a movable portion movable around a shaft.

BACKGROUND ART

A vehicle controller of the related art is known which monitors the output value of an acceleration sensor attached into a vehicle, and applies the output value to various systems (for example, see Patent Literature 1). In this vehicle controller, it is possible to detect whether or not the acceleration sensor attached to the vehicle has an error.

CITATION LIST

Patent Literature

[Patent Literature 1] Japanese Unexamined Patent Application Publication No. 2000-111571

SUMMARY OF INVENTION

Technical Problem

If a vehicle motion state quantity sensor, such as an acceleration sensor, is applied to a vehicle having a movable portion, such as a heavy truck having a cabin, it is considered that the acceleration sensor is mounted in the cabin due to the mounting environment (for example, for water, mud, or flying stone prevention) of the acceleration sensor or due to sensor embedment in another component, such as an airbag ECU. However, when the acceleration sensor is mounted in the cabin, if the cabin is opened and inclined, the acceleration sensor is also inclined, such that an output value corresponding to a large amount of inclination is output despite being stopped. If an excessive output value is detected despite being stopped, a vehicle control system which uses VSC or a sensor signal may erroneously detect abnormality in a sensor output. When the cabin is closed after having been opened once, the inclination of the acceleration sensor is slightly deviated, and even when correction is performed, optimum control may not be performed. As described above, in the vehicle controller of the related art, there are various problems when the vehicle motion state quantity sensor, such as the acceleration sensor, is mounted in the movable portion of the vehicle, making it impossible to perform appropriate control.

The invention has been finalized in order to solve the above-described problems, and an object of the invention is to provide a vehicle controller which can perform appropriate control even when an acceleration sensor is mounted in a movable portion of a vehicle.

Solution to Problem

A vehicle controller according to an aspect of the invention includes a vehicle motion state quantity sensor which is attached to a cabin movable around a shaft, an open/closed state detection unit which detects the open/closed state of the cabin, and a correction unit which corrects the output value of the vehicle motion state quantity sensor. When the open/closed state detection unit detects that the cabin is opened and then closed, the correction unit performs correction.

A vehicle controller according to a still further aspect of the invention includes a vehicle motion state quantity sensor which is attached to a movable portion movable around a shaft, a detection unit which detects movement of the movable portion from a predetermined position, and a correction unit which corrects the output value of the vehicle motion state quantity sensor. When the detection unit detects that the movable portion moves from the predetermined position and then returns to the predetermined position, the correction unit performs correction.

In this vehicle controller, when the open/closed state detection unit (detection unit) detects that the cabin serving as a movable portion is opened and then closed (that is, moves from the predetermined position and then returns to the predetermined position), the correction unit performs correction. When the vehicle motion state quantity sensor is provided in the cabin serving as a movable portion, when the cabin is opened and closed once, the inclination of the vehicle motion state quantity sensor may differ slightly before and after the cabin is opened. For example, when a sensor output operation is performed using the same correction value before and after the cabin is opened, accurate control may not be performed. When correction is performed while constantly changing the correction value even when the cabin is open during stopping of the vehicle, a useless operation is performed, causing an increase in a control load. Thus, correction is performed when the cabin is opened and then closed, making it possible to reduce the control load and to perform accurate control on the basis of the new inclination of the vehicle motion state quantity sensor. With the above, even when the vehicle motion state quantity sensor is provided in the cabin serving as the movable portion of the vehicle, it is possible to perform appropriate control.

A vehicle controller according to another aspect of the invention includes a vehicle motion state quantity sensor which is attached to a cabin movable around a shaft, an open/closed state detection unit which detects the open/closed state of the cabin, and an abnormality detection unit which detects abnormality in the vehicle motion state quantity sensor. When the open/closed state detection unit detects that the cabin is open, abnormality detection of the abnormality detection unit is inhibited.

In this vehicle controller, when the open/closed state detection unit detects that the cabin is open, abnormality detection of the abnormality detection unit is inhibited. Therefore, even when the cabin is moved during stopping and the vehicle motion state quantity sensor is significantly inclined, it is possible to prevent the abnormality detection unit from erroneously detecting abnormality. With the above, even when the vehicle motion state quantity sensor is mounted in the cabin serving as the movable portion of the vehicle, it is possible to perform appropriate control.

A vehicle controller according to a further aspect of the invention includes a vehicle motion state quantity sensor which is attached to a cabin movable around a shaft, an open/closed state detection unit which detects the open/closed state of the cabin, and an operating unit which performs an operation on the basis of the output value of the vehicle motion state quantity sensor. While the open/closed state detection unit detects that the cabin is open, the operating unit holds an operational sensor output value before the cabin is opened as the operational sensor output value of the vehicle motion state quantity sensor.

In this vehicle controller, while the open/closed state detection unit detects that the cabin is open, the operating unit can hold the operational sensor output value of the vehicle motion state quantity sensor before the cabin is opened as the operational sensor output value of the vehicle motion state quantity sensor. Therefore, even when the cabin is moved during stopping, and the vehicle motion state quantity sensor is significantly inclined, such that the output value from the vehicle motion state quantity sensor significantly varies, the operational sensor output value before the cabin is opened is used, thereby preventing erroneous abnormality detection or malfunctioning of other systems.

Advantageous Effects of Invention

According to the invention, even when a vehicle motion state quantity sensor is mounted in a movable portion of a vehicle, it is possible to perform appropriate control.

BRIEF DESCRIPTION OF DRAWINGS

FIG. 6 is a chart showing the state of each output value or an abnormality detection flag when control is performed using a vehicle controller according to an embodiment of the invention.

DESCRIPTION OF EMBODIMENTS

Hereinafter, an embodiment which is suitable for a vehicle controller according to the invention will be described in detail with reference to the drawings.

Figure 1:
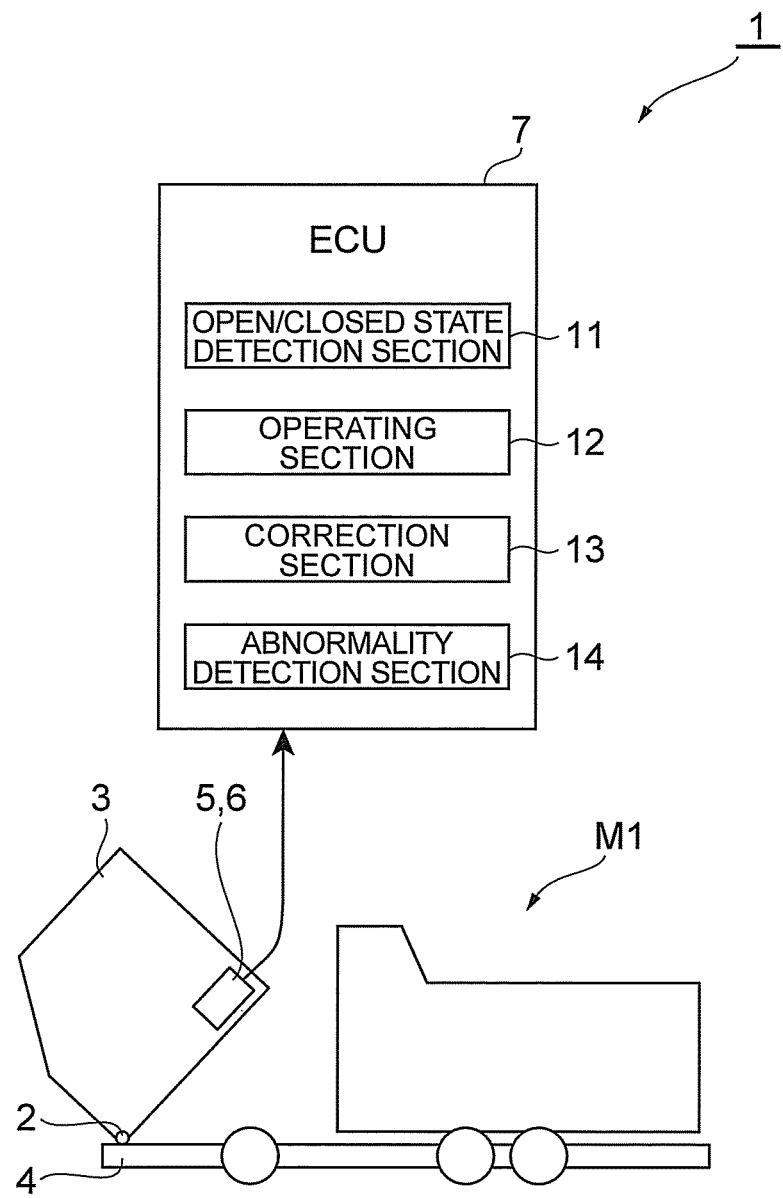
FIG. 1 is a diagram showing the block configuration of a vehicle controller according to an embodiment of the invention.

FIG. 1 is a diagram showing the block configuration of a vehicle controller 1 according to an embodiment of the invention. The vehicle controller 1 is a control device which is mounted in a vehicle M1 having a cabin 3 movable around a shaft 2, such as a heavy truck. In the vehicle M1, usually, the cabin 3 is placed on a base 4 such that the bottom surface of the cabin 3 is substantially disposed horizontally (this state is hereinafter referred to as a state where the cabin 3 is closed). At the time of maintenance, the cabin 3 is moved upward around the shaft 2 and inclined (this state is hereinafter referred to as a state where the cabin 3 is open). The vehicle controller 1 includes a VSC (Vehicle Stability Control) sensor 5 and an ECU (Electronic Control Unit) 7.

The VSC sensor 5 includes an acceleration sensor (vehicle motion state quantity sensor) 6, and various sensors, such as a yaw rate sensor, a steering angle sensor, and a vehicle speed sensor. The VSC sensor 5 and the acceleration sensor 6 are mounted in the cabin 3 of the vehicle M1, are maintained horizontally in a state where the cabin 3 is closed, and are inclined with respect to the horizontal direction in a state where the cabin 3 is open. The VSC sensor 5 and the acceleration sensor 6 have a function of outputting various kinds of detected information to the ECU 7.

The ECU 7 is an electronic control unit which performs overall control of the vehicle controller 1, and includes a CPU as a main component, a ROM, a RAM, an input signal circuit, an output signal circuit, a power supply circuit, and the like. Similarly to the VSC sensor 5, the ECU 7 is mounted in the cabin 3 of the vehicle M1. The ECU 7 includes an open/closed state detection section (open/closed state detection unit, detection unit) 11, an operating section (operating unit) 12, a correction section (correction unit) 13, and an abnormality detection section (abnormality detection unit) 14.

The open/closed state detection section 11 has a function of detecting the open/closed state of the cabin 3. The open/closed state detection section 11 can detect the open/closed state of the cabin 3 on the basis of an output signal of a switch sensor which is provided in, for example, the base 4 and released when the cabin 3 is opened or the inclination angle of the cabin 3.

The operating section 12 has a function of performing various operations on the basis of the output value of the VSC sensor 5. When the cabin 3 is closed, the operating section 12 has a function of setting the current actual output value of the acceleration sensor 6 as an operational sensor output value. While the open/closed state detection section 11 detects that the cabin 3 is open, the operating section 12 has a function of holding the operational sensor output value before the cabin 3 is opened as the operational sensor output value of the acceleration sensor 6. Specifically, the operating section 12 sets the operational sensor output value of the acceleration sensor 6 immediately before the cabin 3 is opened and continues to set the relevant value as the operational sensor output value while the cabin 3 is open.

The correction section 13 has a function of correcting the operational sensor output value of the acceleration sensor 6. The correction section 13 performs correction by calculating as an offset value (sensor correction value) an output value in a state where the vehicle M1 is stopping (a state where the output value of the vehicle speed sensor is zero), and multiplying the sensitivity of the acceleration sensor 6 to the difference between the output value from the acceleration sensor 6 and the correction value. This is generally zero-point correction. The correction section 13 has a function of performing various kinds of correction, such as gain correction, as well as zero-point correction. The correction section 13 has a function of performing correction when the open/closed state detection section 11 detects that the cabin 3 is opened and then closed. Specifically, the correction section 13 resets the sensor correction value already set once when the cabin 3 is opened, and sets a new sensor correction value again when the cabin 3 is closed again. The correction section 13 has a function of inhibiting correction when the cabin 3 is open and permitting correction when the cabin 3 is closed.

The abnormality detection section 14 has a function of detecting abnormality in the VSC sensor 5 and the acceleration sensor 6. For example, the abnormality detection section 14 has a function of determining sensor abnormality when the sensor output value is excessively large. The abnormality detection section 14 has a function of inhibiting abnormality detection when the cabin 3 is open and permitting abnormality detection when the cabin 3 is closed again.

Figure 2:
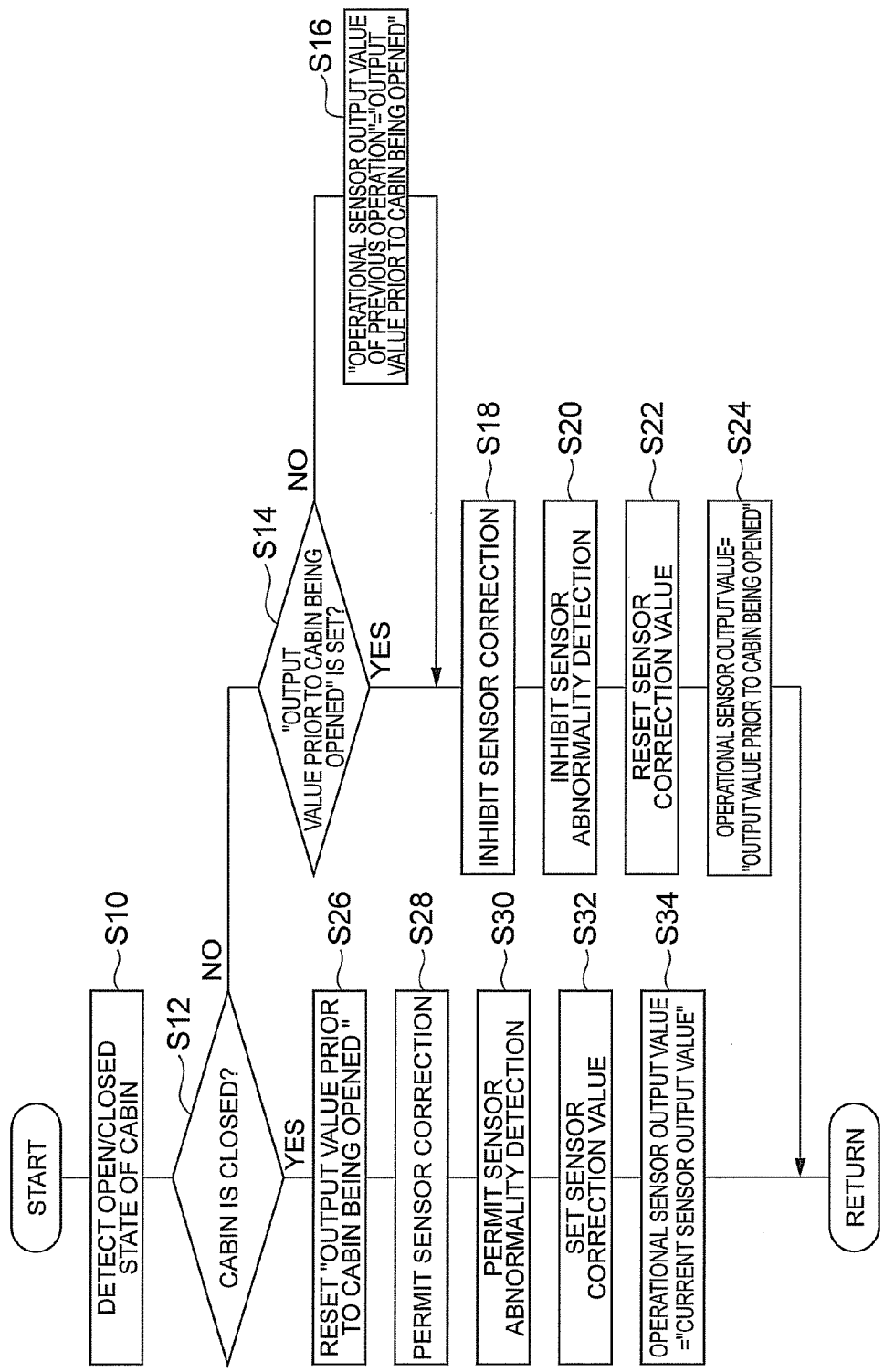
FIG. 2 is a flowchart showing control processing in a vehicle controller according to an embodiment of the invention.

Next, the operation of the vehicle controller 1 of this embodiment will be described with reference to FIG. 2. FIG. 2 is a flowchart showing control processing in the vehicle controller 1 of this embodiment. This processing is performed in the ECU 7 at a predetermined timing during stopping of the vehicle M1.

As shown in FIG. 2, the open/closed state detection section 11 of the vehicle controller 1 detects the open/closed state of the cabin 3 of the vehicle M1 (Step S10). Next, the open/closed state detection section 11 determines whether or not the cabin 3 is closed on the basis of the detection result of S10 (Step S12).

When it is determined in S12 that the cabin 3 is open, the operating section 12 determines whether or not the operational sensor output value of the acceleration sensor 6 before the cabin 3 is opened is already set (Step S14). The output value is the operational sensor output value of the acceleration sensor 6 in the closed state immediately before the cabin 3 is opened, and is hereinafter called "an output value prior to the cabin being opened". In processing immediately after the cabin 3 is opened, the output value prior to the cabin being opened is not set, and after set once, while the cabin 3 is open, it is determined that the output value prior to the cabin being opened is set. When it is determined in S14 that the output value prior to the cabin being opened is not set, the operating section 12 sets a previous operational sensor output value as the output value prior to the cabin being opened (Step S16).

When it is determined in S14 that the output value prior to the cabin being opened is set, or when the processing of S16 ends, the correction section 13 inhibits sensor correction of the acceleration sensor (Step S18). The abnormality detection section 14 also inhibits sensor abnormality detection of the acceleration sensor (Step S20). Next, the correction section 13 resets a sensor correction value currently set (Step S22). Thereafter, the operating section 12 sets the output value prior to the cabin being opened as the operational sensor output value (Step S24). Thus, while the open/closed state detection section 11 detects that the cabin 3 is open, the operating section 12 can hold the operational sensor output value before the cabin 3 is opened as the operational output value of the acceleration sensor. If the processing of S24 ends, the control processing shown in FIG. 2 ends, and the processing restarts from S10 again.

In a state before the cabin 3 is opened or in a state where the cabin 3 is opened and then closed again, in S12, it is determined that the cabin 3 is closed. In this case, the operating section 12 resets the output value prior to the cabin 3 being opened set in S16 when the cabin 3 is opened (Step S26). Next, the correction section 13 permits sensor correction of the acceleration sensor (Step S28). The abnormality detection section 14 also permits sensor abnormality detection of the acceleration sensor (Step S30).

Next, the correction section 13 sets a sensor correction value (Step S32). In the processing of S22, immediately after the cabin 3 is closed, a new correction value is set again, but in a state where the cabin 3 continues to be closed, a correction value already set may be used, and the processing of S32 may be omitted. Thereafter, the operating section 12 sets the current actual output value of the acceleration sensor as the operational sensor output value (Step S34). If the processing of S34 ends, the control processing shown in FIG. 2 ends, and the processing restarts from S10 again.

With the above, according to the vehicle controller 1 of this embodiment, when the open/closed state detection section 11 detects that the cabin 3 is opened and then closed, the correction section 13 can perform correction. When the acceleration sensor 6 is provided in the cabin 3 serving as a movable portion, if the cabin 3 is opened and closed once, the inclination of the acceleration sensor 6 may differ slightly before and after the cabin 3 is opened. For example, when a sensor output operation is performed using the same correction value before and after the cabin 3 is opened, accurate control may not be performed. When correction is constantly performed while the cabin 3 is open during stopping of the vehicle M1, a useless operation is performed, causing an increase in a control load. Therefore, correction is performed when the cabin 3 is opened and then closed, making it possible to reduce the control load and to perform accurate control in accordance with the new inclination of the acceleration sensor 6. With the above, even when the acceleration sensor 6 is mounted in the cabin 3 serving as the movable portion of the vehicle M1, it is possible to perform appropriate control.

According to the vehicle controller 1 of this embodiment, when the open/closed state detection section 11 detects that the cabin 3 is open, the abnormality detection section 14 can inhibit abnormality detection. Therefore, even when the cabin 3 is moved during stopping and the acceleration sensor 6 is significantly inclined, it is possible to prevent the abnormality detection section 14 from erroneously detecting abnormality. With the above, even when the acceleration sensor 6 is mounted in the cabin 3 serving as the movable portion of the vehicle M1, it is possible to perform appropriate control.

According to the vehicle controller 1 of this embodiment, while the open/closed state detection section 11 detects that the cabin 3 is open, the operating section 12 can hold the operational sensor output value of the acceleration sensor 6 before the cabin 3 is opened as the operational sensor output value of the acceleration sensor 6. Therefore, even when the cabin 3 is moved during stopping, and the acceleration sensor 6 is significantly inclined, such that the actual output value from the acceleration sensor 6 significantly varies, the operational sensor output value before the cabin is opened is used, thereby preventing erroneous abnormality detection or malfunctioning of other systems.

Figure 3:
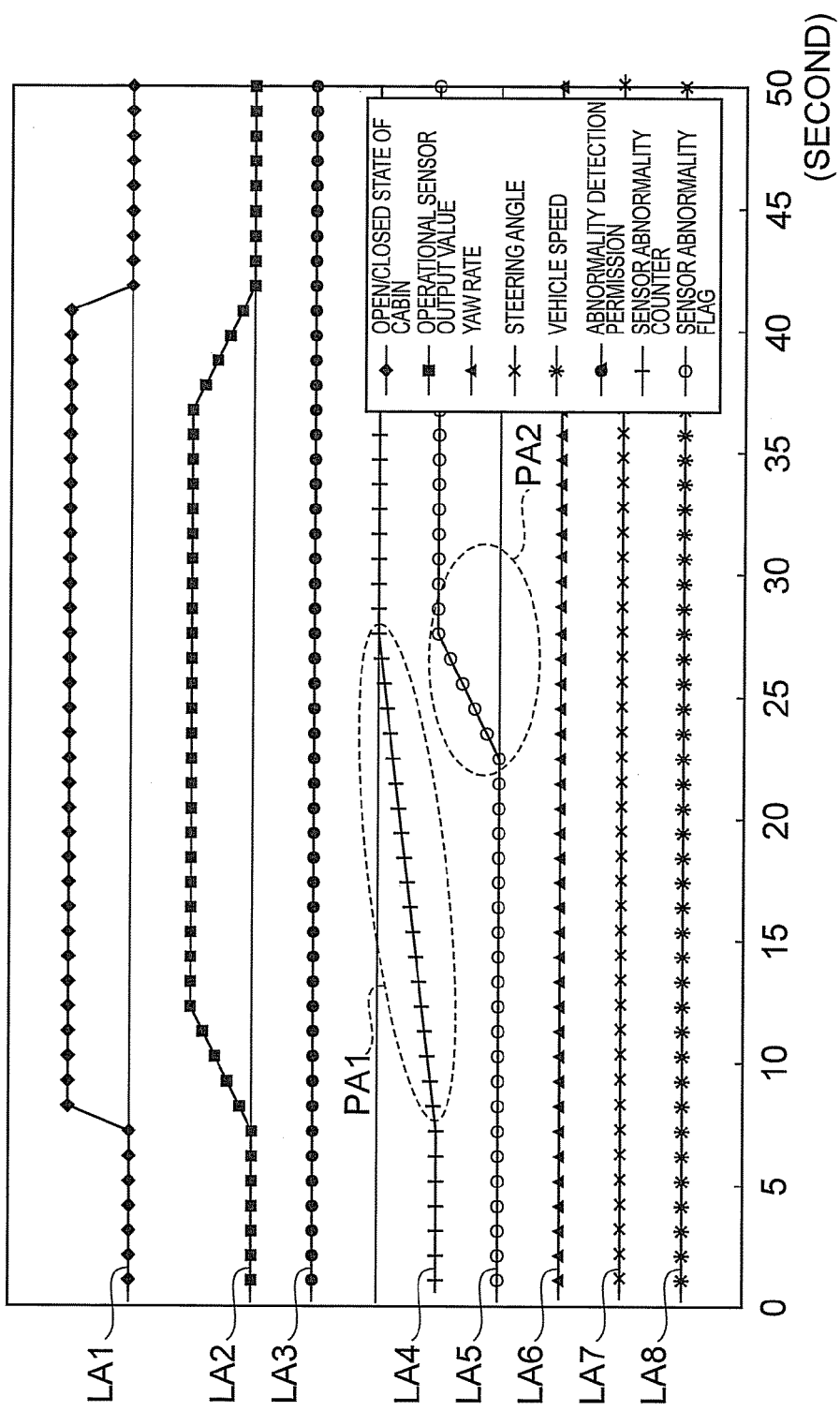
FIG. 3 is a chart showing the state of each output value or an abnormality detection flag when control is performed using a vehicle controller of the related art.
Figure 4:
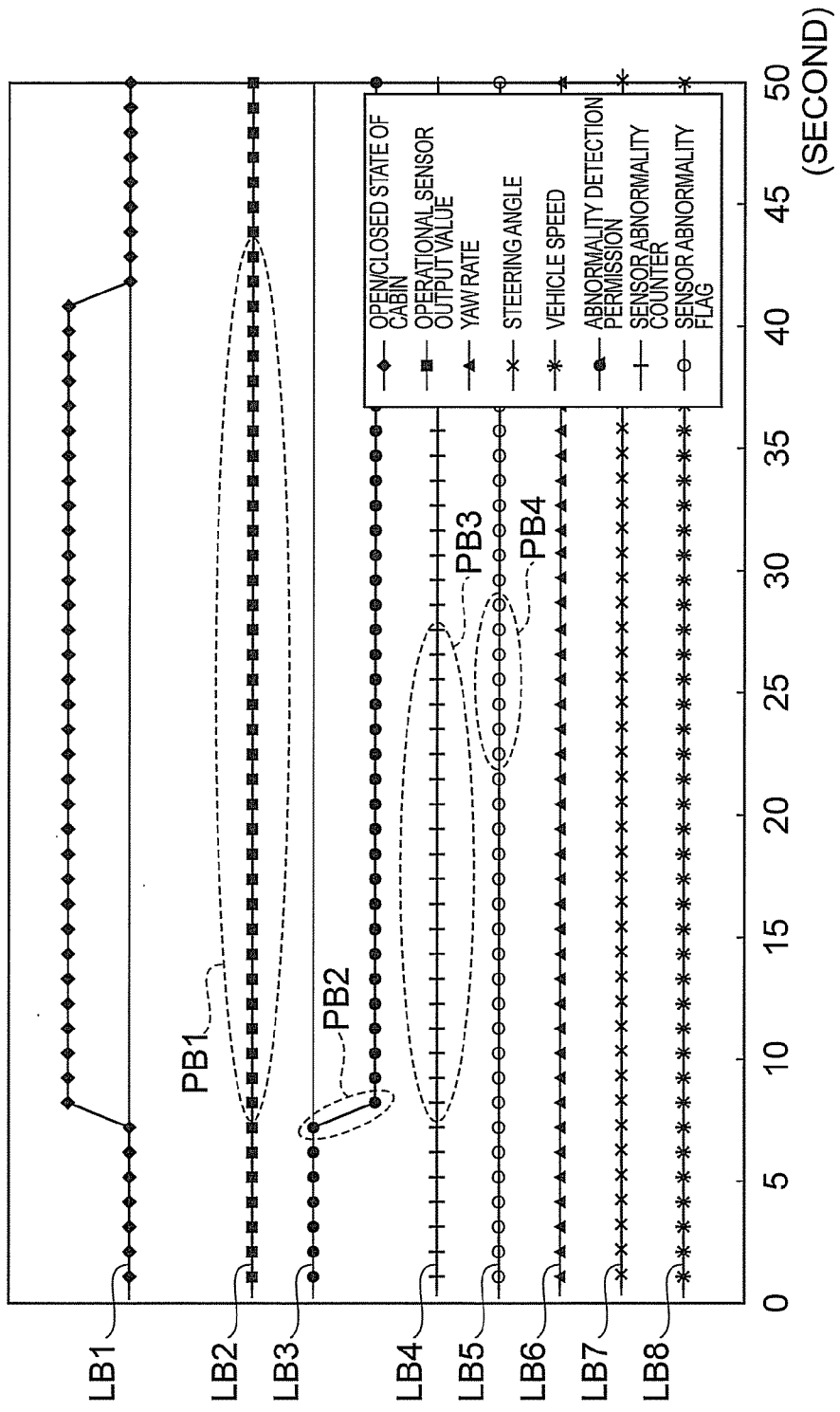
FIG. 4 is a chart showing the state of each output value or an abnormality detection flag when control is performed using a vehicle controller according to an embodiment of the invention.

Next, an example of the vehicle controller 1 of this embodiment will be described in comparison to a vehicle controller of the related art. FIG. 3 is a chart showing the state of each output value or an abnormality detection flag when control is performed using the vehicle controller of the related art. FIG. 4 is a chart showing the state of each output value or an abnormality detection flag when control is performed using the vehicle controller 1 of this embodiment. In FIGS. 3 and 4, charts LA1 and LB1 indicate the open/closed state of the cabin 3. When the line is on the lower side, this indicates a state where the cabin 3 is closed, and when the line is on the upper side, this indicates a state where the cabin 3 is open. Charts LA2 and LB2 indicate the operational sensor output value by the operating section 12 based on the actual output value of the acceleration sensor 6. Charts LA3 and LB3 indicate whether abnormality detection by the abnormality detection section 14 is permitted or inhibited. When the line is on the lower side, this indicates a state where abnormality detection is inhibited, and when the line is on the upper side, this indicates a state where abnormality detection is permitted. Charts LA4 and LB4 indicate a sensor abnormality counter, and indicate a value which is counted by the abnormality detection section 14 so as to detect abnormality in the acceleration sensor 6. Charts LA5 and LB5 indicate a sensor abnormality flag by the abnormality detection section 14. When there is no abnormality, the line is on the lower side, and when abnormality is detected, the flag is raised and the line moves to the upper side. Charts LA6 and LB6 indicate a yaw rate, charts LA7 and LB7 indicate a steering angle, and charts LA8 and LB8 indicate a vehicle speed. FIGS. 3 and 4 show the charts when the vehicle M1 is stopped, the cabin 3 is opened at near 7 to 10 seconds, and the cabin 3 is closed at near 37 to 40 seconds. Since the vehicle M1 is stopping, the yaw rate, the steering angle, and the vehicle speed are not changed.

In the vehicle controller of the related art, the actual output value of the acceleration sensor 6 is used as the operational sensor output value of the acceleration sensor 6, and abnormality detection of the abnormality detection section 14 is not inhibited. Accordingly, as indicated by the chart LA2 of FIG. 3, the operational sensor output value increases as the cabin 3 is opened and decreases as the cabin 3 is closed. As indicated by the chart LA3, abnormality detection is constantly permitted regardless of the open/closed state of the cabin 3. Hence, as indicated by the chart LA4, after the cabin 3 is opened, the sensor abnormality counter increases (indicated by PA1 in the drawing) in accordance with the operational sensor output value. If the sensor abnormality counter increases to be equal to or greater than a certain level, the sensor abnormality flag is raised (indicated by PA2 in the drawing), and sensor abnormality detection is established. As described above, in the vehicle controller of the related art, when the cabin 3 is opened or closed during stopping of the vehicle M1, sensor abnormality is erroneously detected.

In the vehicle controller 1 of this embodiment, while the cabin 3 is open, the operational sensor output value before the cabin 3 is opened can be used as the operational sensor output value of the acceleration sensor 6, and abnormality detection can be inhibited. Accordingly, as indicated by the chart LB2 of FIG. 4, the operational sensor output value is constant regardless of the open/closed state of the cabin 3 (indicated by PB1 in the drawing). As indicated by the chart LB3, when the cabin 3 is opened, abnormality detection of the acceleration sensor 6 is inhibited (indicated by PB2 in the drawing). Hence, as indicated by the chart LB4, even after the cabin 3 is opened, the sensor abnormality counter is not increased (indicated by PB3 in the drawing), and as indicated by the chart LB5, the sensor abnormality flag is not raised (indicated by PB4 in the drawing). As described above, in the vehicle controller 1 of this embodiment, even when the cabin 3 is opened or closed with the acceleration sensor 6 attached to the cabin 3, it is possible to prevent sensor abnormality from being erroneously detected.

Figure 5:
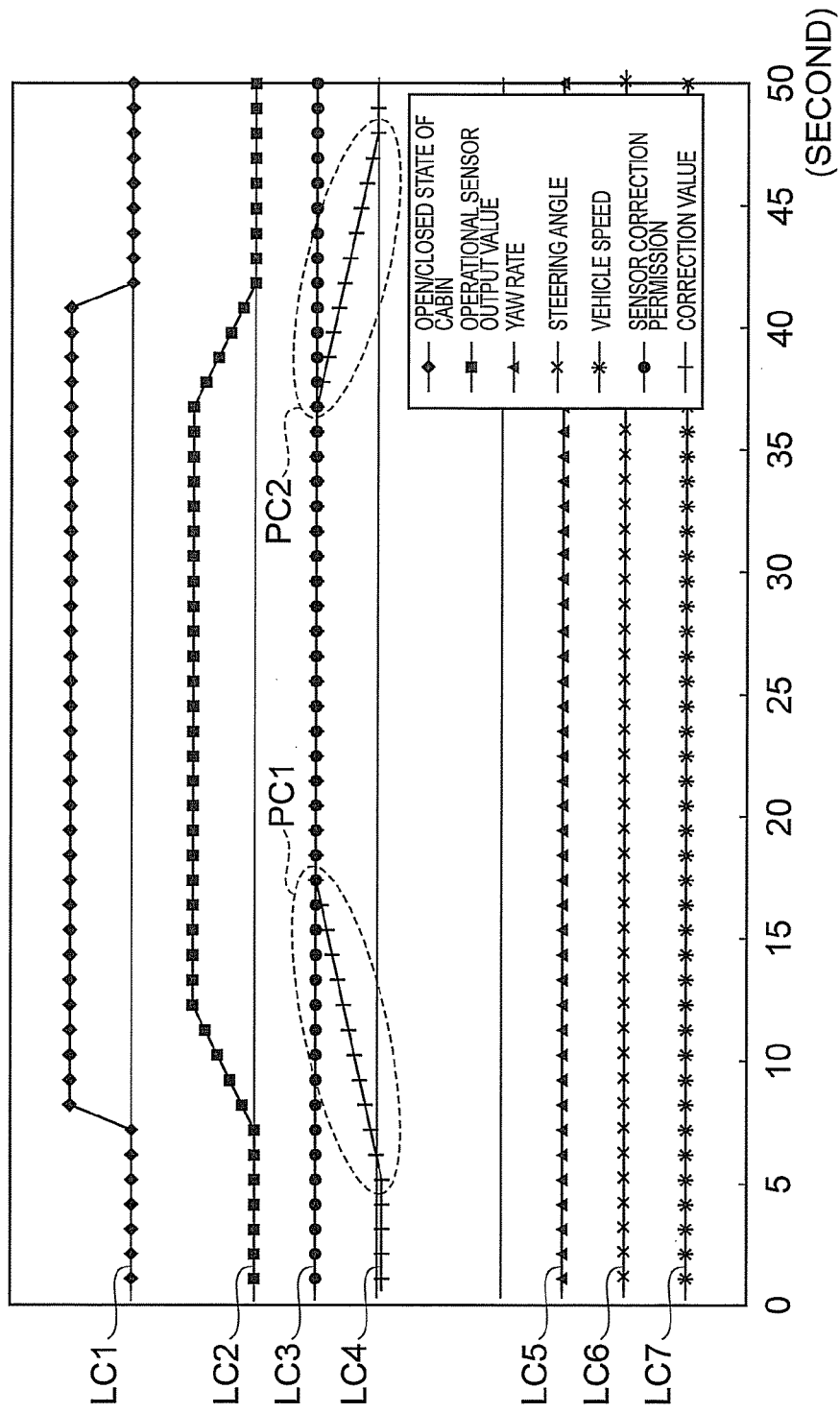
FIG. 5 is a chart showing the state of each output value or a correction value when control is performed using a vehicle controller of the related art.

FIG. 5 is a chart showing the state of each output value or a correction value when control is performed using the vehicle controller of the related art. FIG. 6 is a chart showing the state of each output value or a correction value when control is performed using the vehicle controller 1 of this embodiment. In FIGS. 5 and 6, charts LC1 and LD1 indicate the open/closed state of the cabin 3. When the line is on the lower side, this indicates a state where the cabin 3 is closed, and when the line is on the upper side, this indicates a state where the cabin 3 is open. Charts LC2 and LD2 indicate the operational sensor output value by the operating section 12 based on the actual output value of the acceleration sensor 6. Charts LC3 and LD3 indicate whether correction by the correction section 13 is permitted or inhibited. When the line is on the lower side, this indicates a state where correction is inhibited, and when the line is on the upper side, this indicates a state where correction is permitted. Charts LC4 and LD4 indicate a correction value. Charts LC5 and LD5 indicate a yaw rate, charts LC6 and LD6 indicate a steering angle, and charts LC7 and LD7 indicate a vehicle speed. FIGS. 5 and 6 show the charts when the vehicle M1 is stopped, the cabin 3 is opened at near 7 to 10 seconds, and the cabin 3 is closed at near 37 to 40 seconds. Since the vehicle M1 is stopping, the yaw rate, the steering angle, and the vehicle speed are not changed.

In the vehicle controller of the related art, correction of the correction section 13 is not inhibited, and the correction value changes depending on the operational sensor output value. Accordingly, as indicated by the chart LC3 of FIG. 5, correction is constantly permitted regardless of the open/closed state of the cabin 3. Hence, as indicated by the chart LC4, after the cabin 3 is opened, the correction value increases in accordance with the operational sensor output value (indicated by PC1 in the drawing). As described above, in the vehicle controller of the related art, when the cabin 3 is opened or closed during stopping of the vehicle M1, the correction value changes uselessly, causing an increase in the control load.

In the vehicle controller 1 of this embodiment, while the cabin 3 is open, correction is inhibited, and correction can be performed at the timing when the cabin 3 is closed again. In order to independently verify the effect of correction of the vehicle controller 1 of this embodiment, as indicated by LD2, it is assumed that the operational sensor output value follows the actual output value of the acceleration sensor 6. As indicated by the chart LD3 of FIG. 6, when the cabin 3 is opened, correction is inhibited (indicated by PD1 in the drawing). As indicated by the chart LD4, the correction value is reset. Correction is permitted at the timing when the cabin 3 is closed again, and a new correction value is set (indicated by PD2 in the drawing). Therefore, when the cabin 3 is opened or closed with the acceleration sensor 6 attached to the cabin 3, it is possible to reduce the control load and to perform accurate control in accordance with the new inclination of the acceleration sensor 6.

The invention is not limited to the above-described embodiment.

For example, although in the foregoing embodiment, a case has been described where an acceleration sensor is mounted in a cabin of a heavy truck as an example of a movable portion of a vehicle, the invention is not limited thereto. The invention can be applied to any vehicles in which an acceleration sensor is mounted in a movable portion.

Although in the foregoing embodiment, the vehicle controller has all a function of allowing the correction section 13 to perform correction when the open/closed state detection section 11 detects that the cabin 3 is opened and then closed, a function of inhibiting abnormality detection of the abnormality detection section 14 when the open/closed state detection section 11 detects that the cabin 3 is open, and a function of allowing the operating section 12 to hold the output value before the cabin 3 is opened as the output value of the acceleration sensor 6 while the open/closed state detection section 11 detects that the cabin 3 is open, the vehicle controller may have any one of the functions.

Although in the foregoing embodiment, a case has been described where an acceleration sensor is an example of a vehicle motion state quantity sensor, as the vehicle motion state quantity sensor, any sensor may be used insofar as the sensor detects a physical quantity representing a motion state, such as a pitch, a balance, a yaw, a roll, a yaw rate, or a low rate, and the output value thereof changes depending on the open/closed state of the cabin.

INDUSTRIAL APPLICABILITY

The invention can be used for appropriate control when an acceleration sensor is mounted in a movable portion of a vehicle.

REFERENCE SIGNS LIST

1: vehicle controller, 2: shaft, 3: cabin, 6: acceleration sensor (vehicle motion state quantity sensor), 11: open/ closed state detection section (open/closed state detection unit, detection unit), 12: operating section (operating unit), 13: correction section (correction unit), 14: abnormality detection section (abnormality detection unit).

The invention claimed is:

1. A vehicle, comprising:
a cabin movable around a shaft;
a vehicle controller, the vehicle controller, further comprising:
   a vehicle motion state quantity sensor which is attached to the cabin; and
   an electronic control unit, the electronic control unit, further comprising:
     an open/closed state detection unit which detects the open/closed state of the cabin;
     a correction unit programmed to correct the output value of the vehicle motion state quantity sensor, and
     an operating unit programmed to perform an operation on the basis of the output value of the vehicle motion state quantity sensor,
wherein, when the open/closed state detection unit detects that the cabin is opened and then closed, the correction unit performs correction, and
wherein, when the open/closed state detection unit detects that the cabin is open while the vehicle is stopped, the operating unit is programmed to hold an operational sensor output value before the cabin is opened as the operational sensor output value of the vehicle motion state quantity sensor.

2. A vehicle, comprising:
a cabin movable around a shaft;
a vehicle controller, the vehicle controller, further comprising:
   a vehicle motion state quantity sensor which is attached to the cabin; and
   an electronic control unit, the electronic control unit, further comprising:
     an open/closed state detection unit which detects the open/closed state of the cabin;
     an abnormality detection unit programmed to detect abnormality in the vehicle motion state quantity sensor, and
     an operating unit programmed to perform an operation on the basis of the output value of the vehicle motion state quantity sensor,
wherein, when the open/closed state detection unit detects that the cabin is open, abnormality detection of the abnormality detection unit is inhibited, and
wherein, when the open/closed state detection unit detects that the cabin is open while the vehicle is stopped, the operating unit is programmed to hold an operational sensor output value before the cabin is opened as the operational sensor output value of the vehicle motion state quantity sensor.

3. A vehicle, comprising:
a cabin movable around a shaft;
a vehicle controller, the vehicle controller, further comprising:
   a vehicle motion state quantity sensor which is attached to the cabin; and
   an electronic control unit, the electronic control unit, further comprising:
     an open/closed state detection unit which detects the open/closed state of the cabin; and
     an operating unit programmed to perform an operation on the basis of the output value of the vehicle motion state quantity sensor,
wherein, when the open/closed state detection unit detects that the cabin is open while the vehicle is stopped, the operating unit is programmed to hold an operational sensor output value before the cabin is opened as the operational sensor output value of the vehicle motion state quantity sensor.

* * * * *